April 5, 1960
R. N. FULWIDER
2,931,156
LAWN MOWERS
Filed Feb. 7, 1957
2 Sheets-Sheet 1
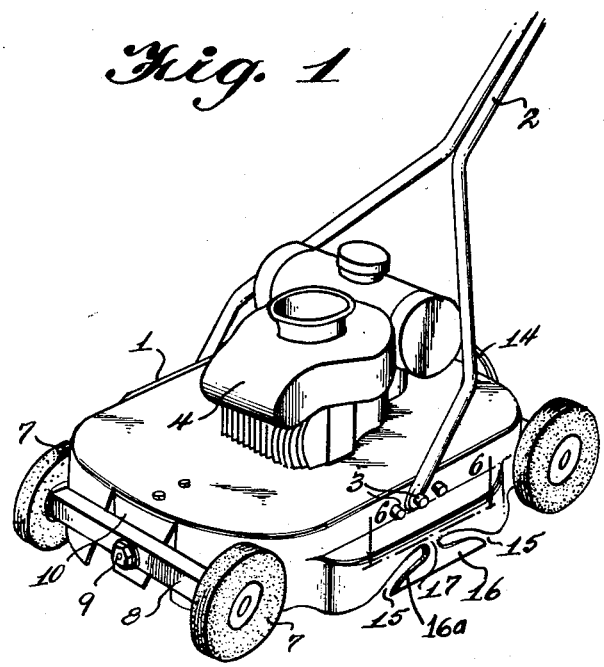
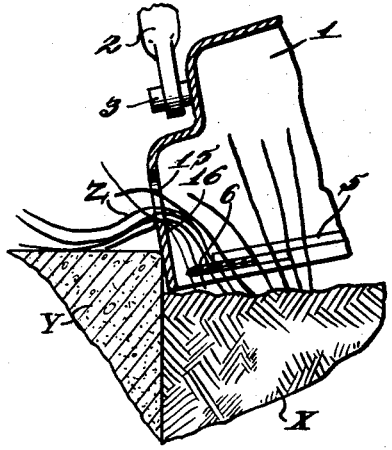
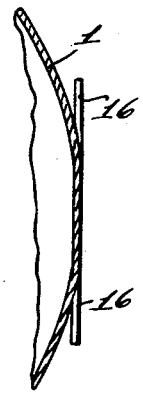
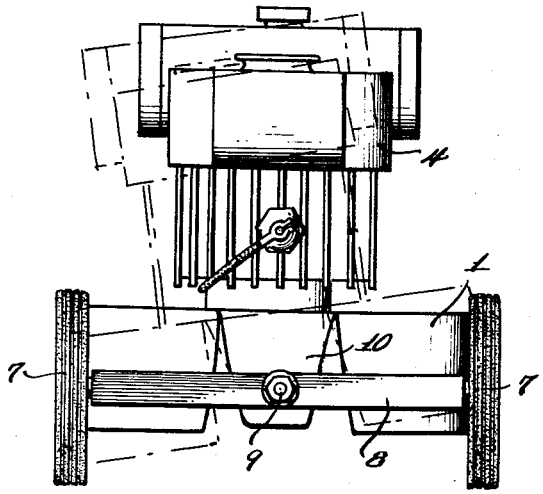
INVENTOR
ROBERT N. FULWIDER
BY Martha Conway
ATTORNEY

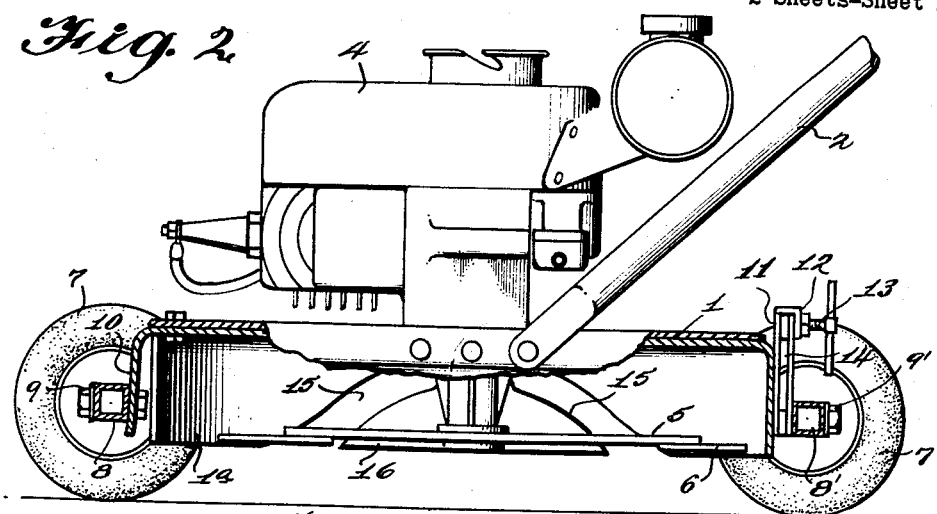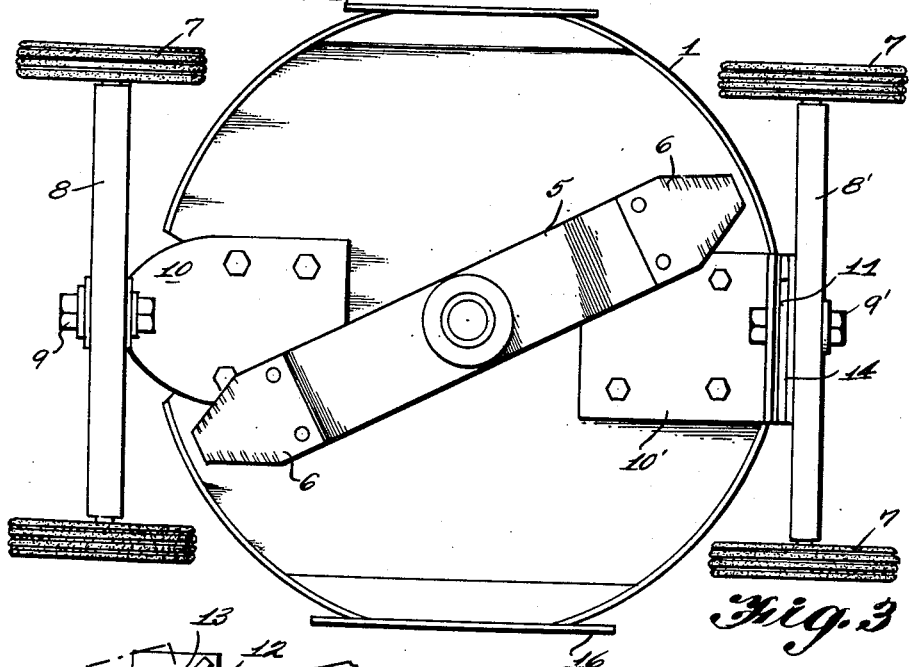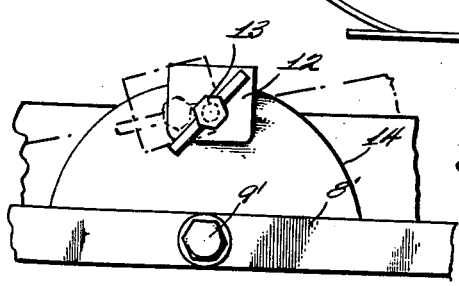

United States Patent Office 2,931,156
Patented Apr. 5, 1960

2,931,156

LAWN MOWERS

Robert N. Fulwider, Henrico County, Va.

Application February 7, 1957, Serial No. 638,787

5 Claims. (Cl. 56—25.4)

This invention relates to lawn mowers, and more particularly to power mowers of the so-called "rotary" type.

With conventional mowers of this type, it is not possible to satisfactorily trim grass growing closely adjacent a wall, walkway, fence, or other rigid structure. An object of the present invention is to devise a mower so constructed that the plane of rotation of the blade may be tilted laterally so as to bring the end of the blade into close proximity to the ground at a point along the side of such a structure.

A further object is to provide means whereby long, recumbent grass, lying over the edge of a walk or against a wall or fence, normally below the plane of rotation of the blade, may be lifted up into a position where it will be cut, as the mower travels along.

With the above and other objects in view, and to improve generally on the details of such apparatus, the invention consists in the construction, combination and arrangement of parts hereinafter described and claimed, and illustrated in the accompanying drawings, forming part of this specification, and in which:

Fig. 1 is a perspective view of my improved mower, part of the handle being broken away;

Fig. 2 is a side elevation thereof, parts being in vertical section;

Fig. 3 is an inverted plan view;

Fig. 4 is a front elevation of the mower, one tilted position of the parts being shown in broken lines;

Fig. 5 is a fragmentary, transverse section on an enlarged scale, illustrating how the mower may trim long, recumbent grass growing along the edge of a concrete walk;

Fig. 6 is a fragmentary, horizontal section on an enlarged scale, taken substantially on the line 6—6 of Fig. 1; and Fig. 7 is a fragmentary rear elevation of the mower, showing the means for locking the parts in any desired angular position.

Referring to the drawings in detail, 1 designates a conventional body or housing, shown as substantially circular, and having the usual depending peripheral flange 1ª. A propelling handle 2 is pivotally secured to any desired one of three pairs of studs 3, mounted on the sides of the housing. A motor 4, shown as of the gasoline type, is mounted on top of the housing, and has a vertical shaft extending downwardly into the interior of the housing and carrying at its lower end a blade of any suitable construction, shown as comprising a bar or body 5 having cutters 6 secured to the ends thereof. As shown in Figs. 2 and 3, these cutters lie closely adjacent the flange 1ª, and, when the motor is running, the blade revolves in its own plane, in a well known manner.

The mower is supported on two pairs of wheels 7, one pair being journaled at the ends of a front axle 8, and the other pair being journaled at the ends of a rear axle 8'. The axles 8 and 8' are pivotally mounted at their middle on pins or bolts 9 and 9', carried by brackets 10 and 10', secured to the housing. It will be noted that these axles are entirely outside of the housing, and that they are of such length that the sides of the housing extend laterally out beyond the plane of the wheels, as shown in Fig. 3. It will be further noted that the pivot pins or bolts 9 and 9' lie on a common axis, disposed parallel with the planes of the wheels. Secured, as by welding, to the outside of the rear bracket 10' is a second bracket 11, having its upper end extended and bent over as indicated at 12. A semi-circular plate 14 is rigidly secured to the rear axle 8, and extends up into the space between the bracket 11 and the bent over end 12 thereof, and a clamping screw 13 passes through the bent over end 12 and bears against the plate 14.

As best shown in Figs. 1 and 2, the flange 1ª, at a point between the wheels 7, is formed with a pair of upwardly converging slots 15, having open lower ends. These slots provide between themselves and the lower edge of the flange a pair of oppositely disposed pointed members 16, supported at the top by a neck 17. Each of these pointed members has an inclined upper edge 16ª, such edges being inclined upwardly from the pointed end toward the neck 17. Thus one pointed member extends forwardly and the other rearwardly. The invention, however, is not limited to the use of a pair of pointed members, as only a single such member, extending (say) forwardly, can be employed, if desired. But it is desirable to provide a pair of pointed members, as shown, so that one may operate when the mower is moving forwardly, and the other when it is moving rearwardly.

It will be particularly observed that, as best shown in Figs. 3 and 6, these pointed members 16 lie in a flat plane, as distinguished from the curved shape of the housing flange. This is done so that they may conform with and run in close proximity to a fence or wall, or the straight edge of a concrete walk.

From the foregoing, it will be seen that I have provided a construction in which housing and blade can pivot about the pins or bolts 9 and 9' and may be tilted laterally relative to the wheels and axles. This tilting movement serves to bring the end of the blade at one side very close to the ground, or close to the edge of a walk or the like. It will be understood that, when the screw 13 is loosened, the housing may be freely tilted by means of the handle 2, as desired. If, on the other hand, it is preferred to set the housing in a definite angular position, this may be accomplished by adjusting it as desired and then tightening the set screw 13, thus rigidly locking the parts against movement.

Referring more particularly to Fig. 5, X designates the ground, and Y a concrete walk or the like. As is well known, long or tall grass, such as shown at Z frequently tends to grow along the edge of such a walk in a more or less prone or recumbent position, so that in many cases, it lies beyond the path of the mower blade, even when tilted. With my improved construction, the pointed member 16 may be run along the edge of the walk in substantial contact therewith, and will pass under the long, recumbent grass and lift it up into a position where the blade can cut it off, the grass entering the slot 15, and riding up on the upper edge of the pointed member as the mower is moved forward.

What I claim is:

1. A power mower of the rotary type comprising a housing, a cutting blade mounted for rotation in its own plane within the housing, two pairs of wheels on which the mower is supported, and front and rear axles on which said pairs of wheels are mounted, said axles being pivotally secured to said housing adjacent each end thereof, said pivots lying on a common axis extending parallel with the planes of said wheels, whereby the housing and blade may be tilted laterally as desired relative to said wheels and axles.

2. A power mower of the rotary type comprising a housing, a cutting blade mounted for rotation in its own plane within the housing, a propelling handle secured to said housing, two pairs of wheels on which the mower is supported, and front and rear axles on which said pairs of wheels are mounted, said axles being pivotally secured to said housing adjacent each end thereof, said pivots lying on a common axis extending parallel with the planes of said wheels, whereby the housing and blade may be tilted laterally by means of said handle as desired relative to said wheels and axles.

3. A power mower of the rotary type comprising a housing, a cutting blade mounted for rotation in its own plane within the housing, two pairs of wheels on which the mower is supported, and front and rear axles on which said pairs of wheels are mounted, said axles being pivotally secured to said housing adjacent each end thereof at points wholly outside of said housing, said pivots lying on a common axis extending parallel with the planes of said wheels, whereby the housing and blade may be tilted laterally as desired relative to said wheels and axles, and means interposed between said housing and one of said axles for locking said housing in any angular position to which it may be tilted.

4. A power mower of the rotary type comprising a normally horizontal housing having a depending peripheral flange, a cutting blade mounted for rotation in its own plane within said housing with its ends closely adjacent said flange, two pairs of wheels on which the housing is supported, an axle on which each pair of wheels is mounted, said housing extending on each side out beyond the plane of the wheels, the flange at one side of said housing at a point between the pairs of wheels being provided with an upwardly and rearwardly inclined slot, open at its lower end, thus forming below said slot a forwardly directed pointed member with an inclined upper edge, and pivot means interconnecting said housing and said axles in such manner that said housing may be tilted laterally with respect to said axles to any desired extent, so as to bring said pointed member into close proximity to the ground, whereby it will engage under and lift up to cutting position any recumbent grass lying below the normal path of the blade.

5. A power mower of the rotary type comprising a normally horizontal housing having an approximately circular depending peripheral flange, a cutting blade mounted for rotation in its own plane within said housing with its ends closely adjacent said flange, two pairs of wheels on which the housing is supported, said housing extending on each side out beyond the plane of the wheels, the flange at one side of said housing at a point between the pairs of wheels being provided with an upwardly and rearwardly inclined slot, open at its lower end, thus producing below said slot a forwardly directed pointed member with an inclined upper edge, and means interconnecting said wheels and housing for mounting said housing on said wheels in such manner that it may be tilted laterally with respect thereto to any desired extent, so as to bring said pointed member into close proximity to the ground, whereby it will engage under and lift up to cutting position any recumbent grass lying below the normal path of the blade, said pointed member being substantially flat, as distinguished from the arcuate shape of the adjacent portion of said flange, whereby it may travel closely along a straight, rigid structure set into the ground.

References Cited in the file of this patent

UNITED STATES PATENTS

| | | |
|---|---|---|
| 2,308,076 | Hainke | Jan. 12, 1943 |
| 2,312,972 | Orr | Mar. 2, 1943 |
| 2,504,259 | Ford | Apr. 18, 1950 |
| 2,672,002 | Nelson | Mar. 16, 1954 |
| 2,680,339 | Murphy | June 8, 1954 |
| 2,709,602 | Orr | May 31, 1955 |
| 2,711,064 | Parker | June 21, 1955 |
| 2,719,396 | Morris et al. | Oct. 4, 1955 |
| 2,721,433 | Berdan | Oct. 25, 1955 |
| 2,722,095 | Farney | Nov. 1, 1955 |
| 2,722,428 | Longbotham | Nov. 1, 1955 |
| 2,734,325 | La Bonté | Feb. 14, 1956 |
| 2,760,327 | Bovee | Aug. 28, 1956 |
| 2,774,207 | Sedgwick | Dec. 18, 1956 |
| 2,787,107 | Strasel | Apr. 2, 1957 |